United States Patent

Okabe et al.

[11] Patent Number: 6,147,758
[45] Date of Patent: Nov. 14, 2000

[54] PROJECTION MEASURING INSTRUMENT

[75] Inventors: Kenji Okabe, Kawasaki; Hiroshi Watabe, Kure; Taizo Nakamura, Kawasaki, all of Japan

[73] Assignee: Mitutoyo Corporation, Kawasaki, Japan

[21] Appl. No.: 09/490,780

[22] Filed: Jan. 24, 2000

[30] Foreign Application Priority Data

Jan. 27, 1999 [JP] Japan ................................ 11-018330

[51] Int. Cl.[7] .................................................. G01B 11/30
[52] U.S. Cl. ............................ 356/371; 356/371; 356/376
[58] Field of Search .................................... 356/391–397, 356/376

[56] References Cited

U.S. PATENT DOCUMENTS 4,567,478  1/1986  Schwab .
5,886,788  3/1999  Kobayashi ........................... 356/391

Primary Examiner—Robert H. Kim
Attorney, Agent, or Firm—Oliff & Berridge, PLC

[57] ABSTRACT

A projection measuring instrument requiring no exchange work of overlay chart for comparatively observing a workpiece image and a template is provided. For the object, a table (56) for a workpiece (55) to be put on, an observation optical system having a screen (1) and a projection lens (53) for projecting an image of the workpiece (55) onto the screen (1), a relative movement unit (57) for relatively moving the table (56) and the observation optical system, and a displacement sensor (61) for detecting relative movement displacement by the relative movement unit (57) are provided, the screen (1) being a liquid crystal display, the liquid crystal display having a display controller (2) for displaying a line drawing for measuring a profile of the workpiece (55) onto the liquid crystal display at a predetermined magnification.

4 Claims, 6 Drawing Sheets

PROJECTION MEASURING INSTRUMENT

BACKGROUND OF THE INVENTION

1. Field of the Invention

The present invention relates to a projection measuring instrument. More specifically, it relates to a projection measuring instrument for enlarging and projecting an image of a minute workpiece for comparative measurement with a template.

2. Description of Related Art

A conventional example is shown in FIG. 4. In the figure, a condenser lens 52, a projection lens 53, and a screen 54 are disposed in this order in an irradiation direction of a light source 51 respectively at a predetermined interval, which composes an observation optical system.

A table 56 for putting a workpiece 55 thereon and a relative movement unit 57 for movably supporting the table 56 are respectively provided between the condenser lens 52 and the projection lens 53.

The relative movement unit 57 movably supports the table 56 in a light axis direction (Z direction) and in two directions orthogonal therewith (X, Y directions) and rotatably supports the table 56 around an axis parallel to the Z direction. The rotary angle is defined as θ.

The light irradiated from the light source 51 illuminates the workpiece 55 through the condenser lens 52. The shadow of the workpiece 55 is magnified by the projection lens 53 and the workpiece image 58 is irradiated onto the screen 54. The screen 54 is a transparent glass having a detachable diffusion-processed overlay chart, the overlay chart having a template of the workpiece on a surface thereof Accordingly, as shown in FIG. 5, the workpiece image 58 and the template 59 of the workpiece 55 are simultaneously displayed onto the screen 54. The observer moves the table 56 while checking the indication on the screen 54 to conduct profile measurement by, for instance, superposing the workpiece image 58 of the workpiece 55 and the template 59.

As shown in FIG. 6, displacement of the table 56 is detected by a displacement sensor 61 and, subsequently, displayed on an external display 62.

The displacement sensor 61 has a linear displacement sensor (such as an optical linear encoder) for detecting displacement of the table 56 in XYZ direction and an angle sensor for detecting rotary angle θ of the table 56 (such as a rotary encoder). The displacement detected by respective encoders, i.e., respective displacement of the table 56 in XYZ directions are counted by a XYZ counter 61a and the rotary angle θ of the table 56 is counted by a θ counter 61b respectively to be displayed to the external display 62.

Accordingly, as shown in FIG. 7, when the overlay chart is changed to a cross-hair reticle 63 and the table 56 is moved for relative movement of the line from one end to the other end of the workpiece image 58, the lo displacements X, Y, Z and θ at the time are displayed on the external display 62, thereby measuring a dimension of the workpiece 55 by the X, Y, Z and θ value displayed onto the external display 62.

However, in the above conventional example, since the overlay chart has to be exchanged in accordance with a type of the workpiece 55 and magnification of the projection lens for comparative observation of the workpiece image 58 and the template 59, exchange work is troublesome.

Further, since the table 56 has to be set at the most appropriate position while looking into the screen 54, the measurement value displayed on the external display 52 was difficult to be checked.

SUMMARY OF THE INVENTION

An object of the present invention is to improve the disadvantage of the above-described conventional example and to provide a projection measuring instrument requiring no exchange work of the overlay chart during comparative observation of the workpiece image and the template.

Another object of the present invention is to provide a projection measuring instrument capable of simultaneously checking the workpiece image and parameters such as displacement of the table etc.

For attaining the above objects, the projection measuring instrument according to the present invention has following arrangement.

An aspect of the present invention is a projection measuring instrument, having: a table for a workpiece to be put on; an observation optical system having a screen and a projection lens for projecting an image of the workpiece onto the screen; a relative movement unit for relatively moving the table and the observation optical system; and a displacement sensor for detecting relative movement displacement by the relative movement unit. The projection measuring instrument is characterized in that the screen is a liquid crystal display, the liquid crystal display having a display controller for displaying a line drawing for measuring a profile of the workpiece at a predetermined magnification.

According to the above arrangement, since the display controller can select the line drawing displayed on the liquid crystal display, the conventional inconvenience of exchanging the overlay chart in accordance with type of the workpiece and magnification of the projection lens can be eliminated.

Another aspect of the present invention is a projection measuring instrument, having: a table for a workpiece to be put thereon; an observation optical system having a screen and a projection lens for projecting an image of the workpiece onto the screen; a relative movement unit for relatively moving the table and the observation optical system; and a displacement sensor for detecting relative movement displacement by the relative movement unit. The projection measuring instrument is characterized in further having a liquid crystal display inserted in an optical path of the observation optical system and a display controller for displaying a line drawing for measuring a profile of the workpiece onto the liquid crystal display at a predetermined magnification.

According to the above arrangement, the line drawing displayed on the liquid crystal display is projected onto the screen together with the workpiece image. Therefore, since the display controller can select the line drawing image displayed onto the liquid crystal display, conventional inconvenience of exchanging the overlay chart in accordance with type of the workpiece and magnification of the projection lens can be eliminated.

In the present invention, the display controller may preferably display a relative movement displacement detected by the displacement sensor on the liquid crystal display.

According to the above arrangement, the line drawing for profile measurement and the displacement of the table is displayed on the screen as well as the workpiece image. Therefore, the displacement of the table can be simultaneously checked during operation of the table while confirming the position of the workpiece on the screen.

Incidentally, the relative movement displacement and the line drawing image on the liquid crystal display may be simultaneously displayed, or alternatively, may be alternately displayed.

For simultaneous display mode, the line drawing image may be, for instance, displayed at a central part of the liquid crystal display and the values may be displayed on a peripheral part. In alternate display mode, the line drawing image may be ordinarily displayed and the values may be switchably displayed by an external operation such as press of button. Alternatively, the alternate display mode may be switched to the simultaneous display mode by the external operation (for instance, the value is shown to a predetermined peripheral position of the line drawing). Instead of the external operation, a timer may be employed for switching the display modes.

The simultaneous display mode is suitable when the value display of the relative movement displacement can be sufficiently small relative to the screen. On the other hand, when large display of the value is required, the alternate display mode may be suitably used. The value can be displayed to a prominent position such as the center of the screen in the alternate display mode.

Further, the line drawing and the displacement may be displayed in color. Especially, the line drawing may be partially or entirely painted in gradation or in color. The line drawing may include projector information such as magnification and workpiece information such as name and dimension of the workpiece.

DETAILED DESCRIPTION OF PREFERRED EMBODIMENT(S)

An embodiment of the present invention will be described below with reference to FIG. 1 and FIG. 2. Incidentally, the same reference signs will be attached to components identical with the conventional example to omit redundant explanation.

Figure 1:
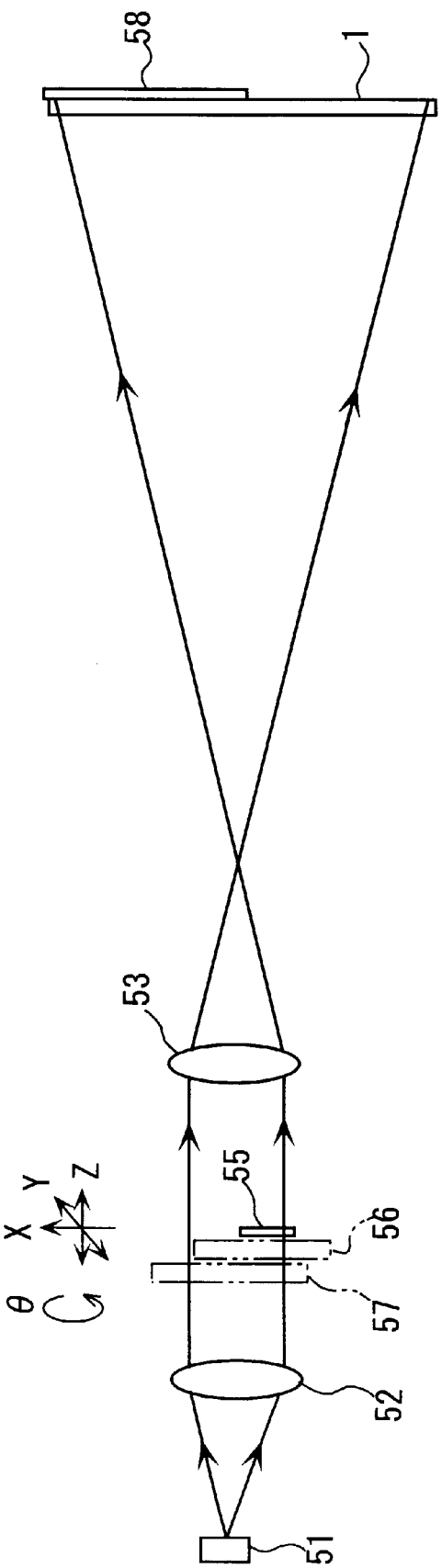
FIG. 1 is a block diagram showing an embodiment of the present invention.

As shown in FIG. 1, the projection measuring instrument according to the present embodiment has a liquid crystal display screen 1 instead of the Conventional screen 54. The liquid crystal display screen 1 has a plain diffusion screen on a surface of the liquid crystal display. The respective components structuring the liquid crystal display are transparent during non-display status and become opaque during display status.

Figure 2:
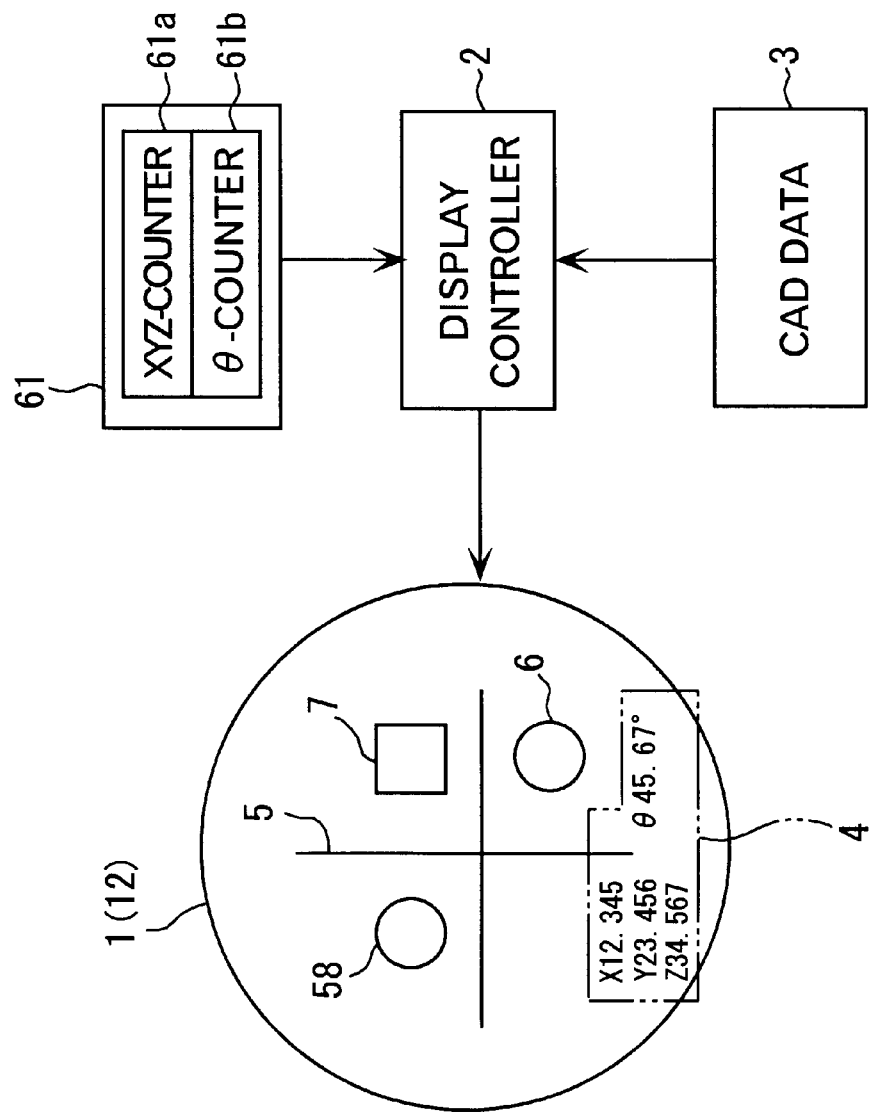
FIG. 2 is a block diagram showing an arrangement of a control system of a liquid crystal display (screen) of FIG. 1.

The liquid crystal display is a LCD panel etc, which is, as shown in FIG. 2, connected to a display controller 2. A display sensor 61 identical with the conventional example and a memory 3 storing CAD data of the reticle template are connected to the display controller 2. The CAD data includes data of the reticle and profile data as a template of the workpiece.

The display controller 2 includes a computer for executing a data display program (data display function). The data display program reads an output value of the XYZ counter 61a and the θ counter 61b from the displacement sensor 61 to display to a parameter display area 4 in the liquid crystal display (screen) 1. Further, the data display program selects a predetermined CAD data from the memory 3 in accordance with selective input from the outside (not shown) to display a cross-hair line 5 and a templates 6 and 7 of the workpiece edited in a predetennined magnification onto the liquid crystal display (screen) 1.

Accordingly, since the parameters X, Y, Z and θ of the displacement of the table 56 as well as the workpiece image 58 are reflected to an eye of the observer, the displacement of the table 56 can be simultaneously checked without releasing the eye from the screen 1 even when the table 56 is operated while looking into the screen 1.

Further, most appropriate template can be displayed without requiring conventional exchange work of the overlay chart since the display data onto the liquid crystal display (screen) 1 is changed.

According to the present embodiment, since the table 56 for putting on the workpiece 55, the observation optical system having the screen 1 and the projection lens 53 for projecting the workpiece 55 onto the screen 1, the relative movement unit 57 for relatively moving the table 56 and the observation optical system, the displacement sensor 61 for detecting relative movement displacement by the relative movement unit 57, the screen 1 being a liquid crystal display, and the display controller 2 for displaying the line drawings 5, 6 and 7 for measuring the profile of the workpiece 55 at a predetermined magnification are provided, the line drawings displayed onto the liquid crystal display can be selected by the display controller 2, thus eliminating conventional inconvenience in exchanging the overlay chart in accordance with type of the workpiece 55 and the magnification of the projection lens 53.

Next, another embodiment of the present invention will be described below with reference to FIG. 3.

During description of the figure, the same reference signs will be attached to components identical with the conventional example and the above-described embodiments to omit redundant description.

Figure 3:
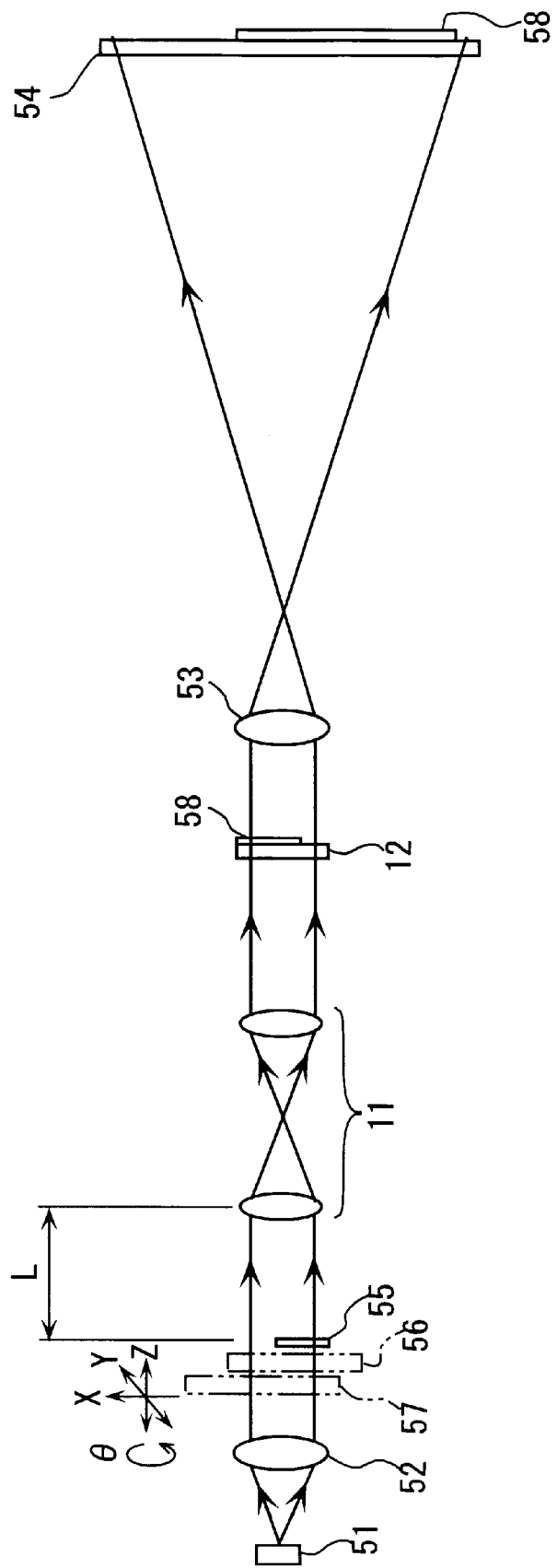
FIG. 3 is a block diagram showing another embodiment of the present invention.
Figure 4:
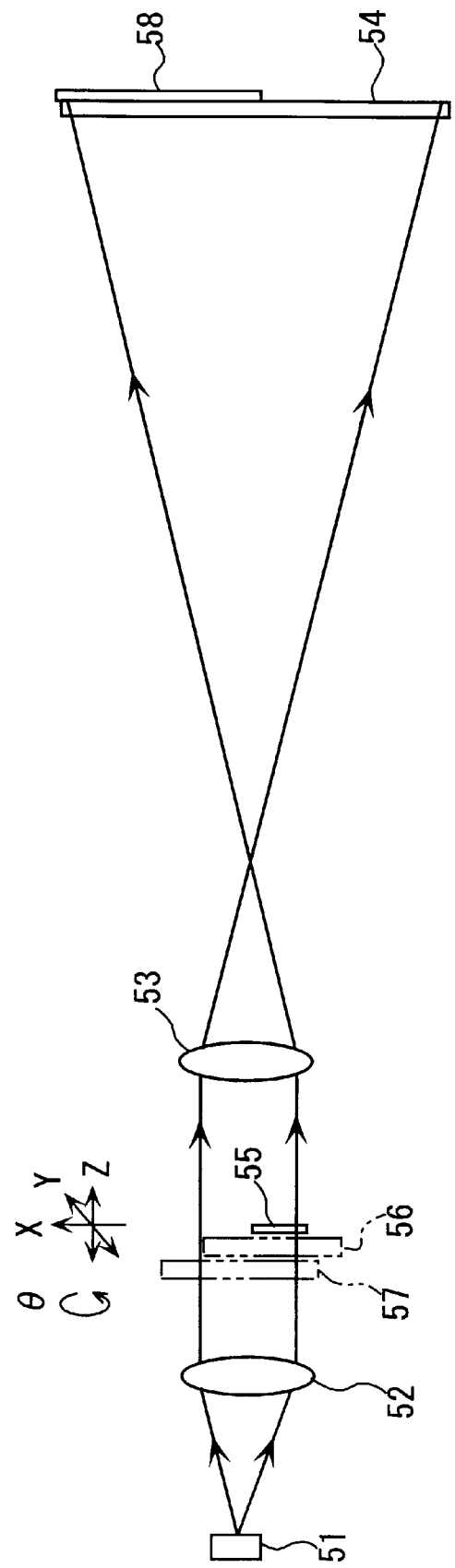
FIG. 4 is a block diagram of a conventional example.
Figure 5:
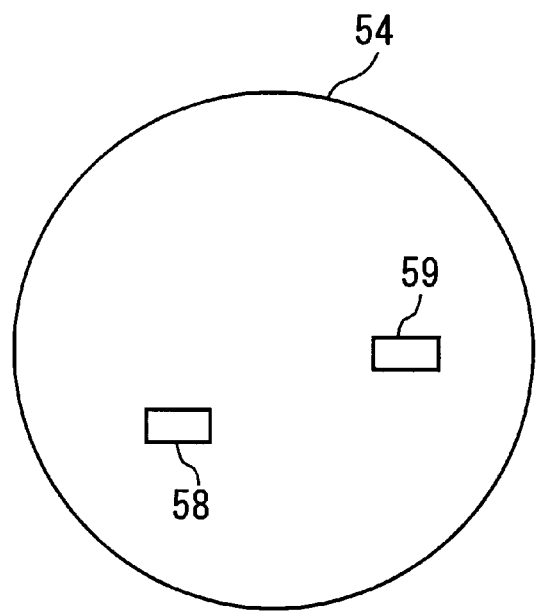
FIG. 5 is an illustration showing display status of the screen in FIG. 4.
Figure 6:
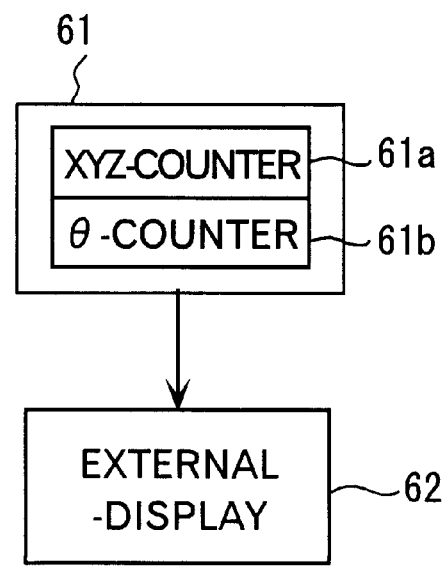
FIG. 6 is a block diagram of a display system for displaying the displacement of the table of FIG. 4.
Figure 7:
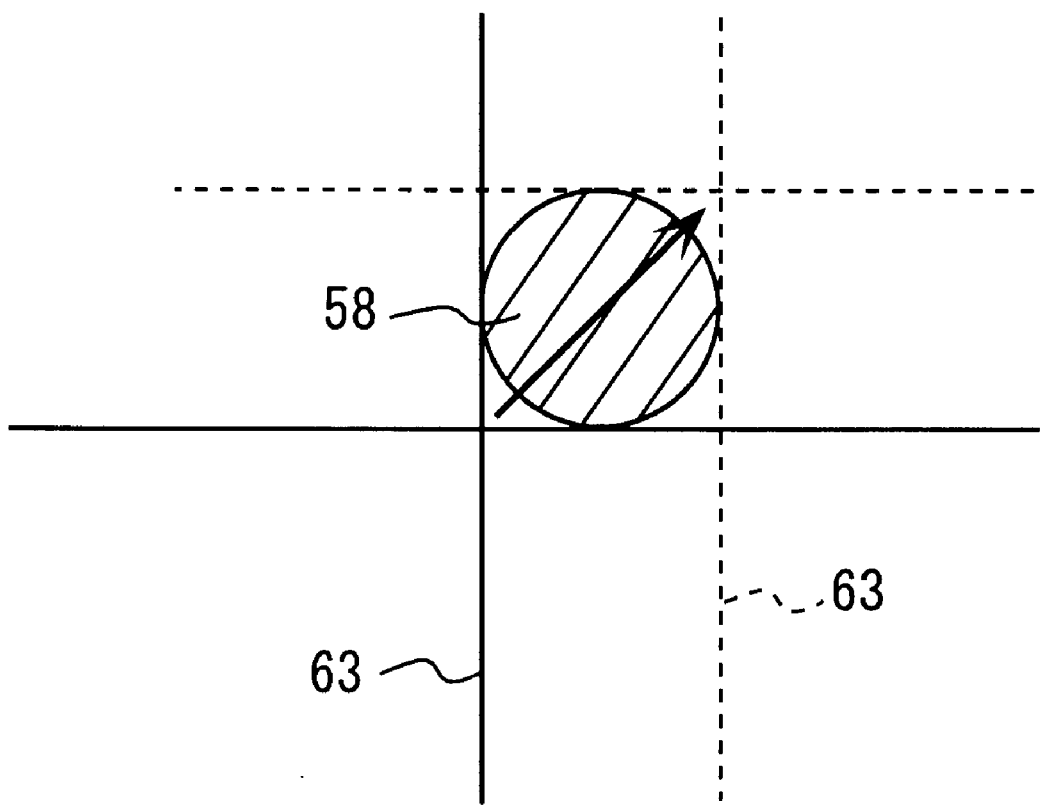
FIG. 7 is an illustration showing a measurement method using a projection measuring instrument.

The projection measuring instrument shown in FIG. 3 has a pair of relay lens 11 between the condenser lens 52 and the projection lens 53 in addition to the arrangement of the above-described embodiment. Further, a liquid crystal display 12 is inserted between the relay lens 11 and the projection lens 53.

Since the relay lens 11 is inserted on the optical path, a working distance L from a disposition surface of the table 56 to the lens can be secured relatively long, thereby obtaining wide movable range of the table 56 in Z direction.

In the present embodiment, the relay lens 11 relays the image by 1:1. Respective portions composing the liquid crystal display 12 are transparent during non-display status and opaque during display-status. The liquid crystal display is LCD panel etc, which is identical with the aforesaid embodiment in being connected to the display controller 2 as shown in FIG. 2. On the other hand, unlike the aforesaid embodiment, the screen 54 is an obscure glass or transparent glass having a plain diffuision screen.

In the present embodiment, when the light is irradiated from the light source 51, the image of the workpiece 55 reaches the liquid crystal display 12 piercing the relay lens 11. Reticle, template reticle of the workpiece, and the displacements X, Y, Z and θ are selectively displayed in accordance with a predetermined external input by the display controller 2. The items displayed contents of the liquid crystal display 12 and the image of the workpiece 55 enter together into the projection lens 53 to be enlarged and projected onto the screen 54.

Since the display controller 2 selects the template reticle displayed on the liquid crystal display 12 to change the template reticle displayed onto the screen 54, conventional trouble for exchanging the overlay chart can be eliminated.

Further, since the display controller 2 displays the reticle and the displacement X, Y, Z and θ of the table 56 onto the liquid crystal display 12 to be displayed onto the screen 54 simultaneously with the workpiece image 58 of the workpiece 55, the observer can check the displacements X, Y, Z and θ of the table 56 on the same screen while moving the table 56 looking into the screen 54, thus improving operability thereof Further, the screen 54 can be changed to a digital protractor screen (a screen with the rotary angle of the screen 54 being digitally displayed thereonto) for obtaining the angle θ instead of the table 56.

According to the present embodiment, since the table 56 for putting on the workpiece 55, the observation optical system having the screen 54 and the projection lens 53 for projecting the workpiece 55 onto the screen 54, the relative movement unit 57 for relatively moving the table 56 and the observation optical system and the displacement sensor 61 for detecting relative movement displacement by the relative movement unit 57 are provided, and, further, since the liquid crystal display 12 inserted on the optical path of the observation optical system and the display controller 2 for displaying the line drawings 5, 6 and 7 for measuring the profile of the workpiece 55 on the liquid crystal display 12 at a predetermined magnification are provided, the line drawings displayed onto the liquid crystal display 12 is projected to the screen 54 together with the image of the workpiece 55. Accordingly, the display controller 2 can select the line drawing displayed on the liquid crystal display 12, thus eliminating conventional inconvenience in exchanging the overlay chart in accordance with type of the workpiece 55 and the magnification of the projection lens 53.

Further, since the display controller 2 displays the relative movement displacement X, Y, Z and θ detected by the displacement sensor 61 on the liquid crystal display 1 and 12 in the aforesaid respective embodiments, the displacements X, Y, Z and θ of the table 56 can be displayed on the screen 1 and 54 as well as the image of the workpiece 55, so that the displacements X, Y, Z and θ of the table 56 can be simultaneously checked during operation of the table 56 while checking the position of the workpiece 55 by the screen 1 and 54.

What is claimed is:

1. A projection measuring instrument, comprising:

a table for a workpiece to be put on;

an observation optical system having a screen and a projection lens for projecting an image of the workpiece onto the screen;

a relative movement unit for relatively moving the table and the observation optical system; and a displacement sensor for detecting relative movement displacement by the relative movement unit;

wherein the screen is a liquid crystal display, the liquid crystal display having a display controller for displaying a line drawing for measuring a profile of the workpiece at a predetermined magnification.

2. A projection measuring instrument, comprising:

a table for a workpiece to be put on;

an observation optical system having a screen and a projection lens for projecting an image of the workpiece onto the screen;

a relative movement unit for relatively moving the table and the observation optical system; and a displacement sensor for detecting relative movement displacement by the relative movement unit;

the projection measuring instrument further having a liquid crystal display inserted in an optical path of the observation optical system and a display controller for displaying a line drawing for measuring a profile of the workpiece onto the liquid crystal display at a predetermined magnification.

3. The projection measuring instrument according to claim 1, wherein the display controller displays a relative movement displacement detected by the displacement sensor onto the liquid crystal display.

4. The projection measuring instrument according to claim 2, wherein the display controller displays a relative movement displacement detected by the displacement sensor onto the liquid crystal display.

* * * * *